United States Patent [19]
Chen

[11] Patent Number: 5,155,553
[45] Date of Patent: Oct. 13, 1992

[54] MULTIPLE-COLOR NULL LENS EMPLOYING REFRACTIVE AND DIFFRACTIVE OPTICAL ELEMENTS

[75] Inventor: Chungte W. Chen, Irvine, Calif.

[73] Assignee: Hughes Aircraft Company, Los Angeles, Calif.

[21] Appl. No.: 631,834

[22] Filed: Dec. 21, 1990

[51] Int. Cl.⁵ .................................................. G01B 9/02
[52] U.S. Cl. .................................. 356/354; 356/124; 356/359
[58] Field of Search ........................... 356/124–128, 356/354, 359, 360

[56] References Cited

U.S. PATENT DOCUMENTS 4,958,931  9/1990  Tatian ............................... 356/360

OTHER PUBLICATIONS

"Optical Shop Testing", Chapter 14, John Wiley & Sons, (1978).

Wyant, J. C., "Testing Aspherics Using Two-Wavelength Holography", Appl. Opt., 10, p. 2113 (1971).

*Primary Examiner*—Samuel A. Turner
*Assistant Examiner*—K. P. Hantis
*Attorney, Agent, or Firm*—William J. Streeter; Georgann S. Grunebach; W. K. Denson-Low

[57] ABSTRACT

Disclosed is an apparatus (10) for null lens testing of an optical element (20). This apparatus incorporates both refractive (32, 36) and diffractive (30, 34) optical elements to create a null lens testing apparatus (10) tuned to two separate wavelengths. By combining or superimposing the interference patterns from the two wavelengths in an interferometer (12) using the two-wavelength holographic technique, the null lens testing apparatus (10) can desensitize the tests such that a single null testing apparatus (10) can be used to test an optical element (20) from its early fabrication stages to its final polishing stages.

22 Claims, 1 Drawing Sheet

MULTIPLE-COLOR NULL LENS EMPLOYING REFRACTIVE AND DIFFRACTIVE OPTICAL ELEMENTS

BACKGROUND OF THE INVENTION

1. Field of the Invention

This invention relates generally to a null lens testing apparatus for measuring flaws in an optical element, and more specifically, to a multiple-wavelength null lens testing apparatus incorporating both refractive and diffractive optical elements for measuring flaws in an optical element.

2. Background of the Invention

A null lens is a lens or system of lenses which creates a wavefront having a desirable or predetermined shape, and being free from aberrations not associated with the desired wavefront. Null lenses used to measure flaws or defects with great precision during the fabrication of an optical element are known in the art. See for example, *Optical Shop Testing*, Chap. 14, John Wiley and Sons, (1978), herein incorporated by reference. The null lens generates a wavefront shape to match the surface shape of the optical element under test if it were perfect. These types of null lens testing apparatuses generally incorporate Offner type null lens or computer generated holography. Typically, a null lens will generate a spherical wavefront for measuring a spherical optical element. Not only can a null lens testing apparatus be used to measure flaws of spherical optical elements, but can also be used to measure conic or aspheric optical elements. Unfortunately, these latter types of null lens testing apparatus have been heretofore limited to a single wavelength. For wavelengths other than the design wavelength, the null lens suffers chromatic aberrations of all orders. Consequently, limitations on a single wavelength prevent the null lens from testing aspheric optical elements at a wide variety of fabrication stages of the optical element due to the limits of the types and sizes of flaws a particular wavelength can detect. A null lens designed at an infrared wavelength is generally used during early optical fabrication stages, and a visible wavelength null lens is generally used for intermediate and final stages of fabrication of the optical element. Therefore, a plurality of null lens testing devices must be used to test a single optical element through its fabrication stages.

One method of utilizing a single null lens to perform multi-wavelength null tests is the use of a reflective null lens, known to those skilled in the art. However, reflective null lenses suffer the drawbacks of large size, great expense and heavy weight so as to severely limit the use of a reflective null lens for most null testing. In addition, most reflective null lenses generally require a refractive field lens, which generally has the same function as the second lens of an Offner refractive null lens system. Therefore, the operating wavelength is substantially limited to a single wavelength.

It is a further method known in the art to have achromatic or multi-wavelength null lenses by incorporating complicated lens systems such as lens doublets or triplets. However, because of the multitude of lens elements it is very difficult to meet the alignment and fabrication tolerances to obtain the proper certification of a null lens to reach modern requirements of many optical elements. Because of this, achromatic null lenses of this type are generally only possible for null testing of optical elements having relatively mild aspherics requiring less stringent tolerances. In the case of strong aspheric optics, it is almost impossible to correct the chromatic aberrations of all orders with a complicated lens system. What is needed then is a simple null lens testing apparatus which is capable of high precision multiple wavelength testing of conic or high aspheric optical elements. It is an object of a preferred embodiment of this invention to provide such an apparatus.

SUMMARY OF THE INVENTION

Disclosed is an achromatic or multi-wavelength null lens employing the combination of refractive and diffractive elements for performing null tests on strong aspheric optical elements. The incorporation of the refractive and diffractive elements enables the null lens to be tuned at two separate wavelengths thus enabling an equivalent wavelength to be formed such that an optical element under test can be tested for defects at a wide range of manufacturing stages. The equivalent wavelength enables a desensitized interference pattern to be formed by superimposing an interference pattern formed by the first wavelength on an interference pattern formed by the second wavelength, generally by the two-wavelength holographic technique. Therefore, the interference pattern formed by the equivalent wavelength provides a representation of a wavelength which would be used for larger type defects of an optical element under test. Using one of the interference patterns alone provides for high precision detection of smaller defects. By this, the sensitivity of the null lens test can be tuned from a fraction of visible wavelength to the millimeter range.

The combination of refractive and diffractive optical elements in a null lens testing apparatus significantly reduces the complexity of the optics required as compared to a conventional multi-wavelength null lens. In addition, the multi-wavelength null lens described herein greatly increases the fabrication tolerance margin, and increases the dynamic range of the null test sensitivity as much as four orders of magnitude. As a result of these advances over the traditional null lens testing apparatus, optical elements having conic or very aspheric shapes ranging from a few centimeters to several meters in diameter can be effectively tested. Because of this, significant reductions in fabrication and assembly costs can be achieved. In addition, the principles of this invention can also be applied to a reflective null lens system, where the field lens is replaced by a refractive and diffractive lens.

Additional objects, advantages and features of the present invention will become apparent from the following description and appended claims, taken in conjunction with the accompanying drawings.

DETAILED DESCRIPTION OF THE PREFERRED EMBODIMENTS

The description of the preferred embodiments are merely exemplary in nature and are in no way intended to limit the invention or its applications or uses.

Figure 1:
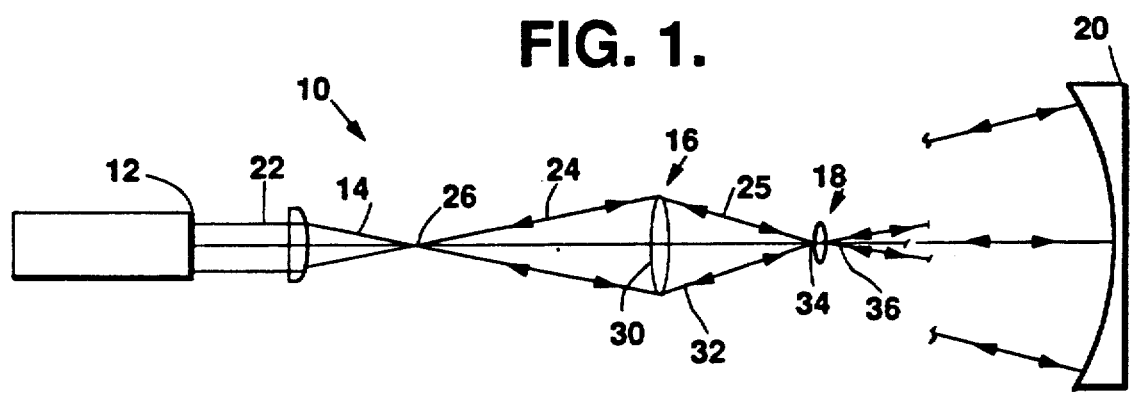
FIG. 1 is an achromatic null lens testing apparatus according to a preferred embodiment of the present invention.

FIG. 1 shows a null lens testing apparatus generally shown at 10 according to a preferred embodiment of the present invention. The null lens testing apparatus as defined herein is a flaw testing system which includes a null lens as an important component. System 10 includes an interferometer 12 which generates a beam of optical radiation 22 and also receives a return beam of optical radiation along the same path for performing certain tests on the return beam. System 10 further includes an objective lens 14, a large imaging lens 16, a small imaging lens 18 and an optical element 20 under test. Both lenses 16 and 18 generally have a flat upstream side 30 and 34, respectively, and a rounded downstream side 32 and 36, respectively. Generally, lenses 16 and 18 will be of the dispersive glass type lens having a specific index of refraction. As can be seen from FIG. 1, objective lens 14 is positioned proximate to interferometer 12, large lens 16 is positioned next along the beam of optical radiation 22 and small lens 18 is positioned between large lens 16 and the optical element 20 under test which receives the optical radiation. The combination of lens 16 and 18 make up the well known Offner type lens system.

In operation of the traditional null lens testing apparatus incorporating the Offner lens system, a collimated beam of light, generally in either the visible or infrared spectrum range, is emitted from interferometer 12 and impinges upon objective lens 14. Objective lens 14 focuses the beam 22 to a point 26 to form a focussed beam 24. The focused beam 24 then impinges large lens 16. Lens 16 creates a beam 25 having a shaped wavefront at a particular wavelength to match the shape of element 20 under test if it were perfect by creating the majority of the required aberrations to match the desired shape of element 20. If element 20 had a spherical shape, then lens 16 would create a spherical wavefront as would be typical from a point source. This wavefront would be free from all aberrations. Typically, element 20 will be aspheric, and thus the dispersive qualities of lens 16 will be designed to create the appropriately shaped wavefront to match element 20. Lens 18 images the beam 25 having the formed wavefront at the particular wavelength onto element 20, and also generates higher order aberrations to further match the desired shape of element 20 under test.

The shaped wavefront 25 impinges element 20 and is reflected back through lens 18, lens 16 and objective lens 14 such that the return wave is collimated into interferometer 12. The return wave is caused to interfere with a reference beam created from the original beam within interferometer 12 by well known means, and thus an interference pattern is created. The interference pattern can be viewed in such a way that portions on optical element 20 which did not conform with the shaped wavefront 25 can be observed. One method of viewing the interference pattern to detect the flawed portions is to tilt the reference wave of the interferometer such that the flaws appear as bumps on interference pattern lines. Therefore, optical element 20 can be polished at these locations to eliminate the flaws.

Since in the traditional null system, lens 16 can only create wavefronts having a single wavelength, the sensitivity to certain flaws on element 20 is limited by the specific wavelength for which the system is designed. For flaws of a larger size, which would exist during the early fabrication stages of the optical element, an infrared wavelength is generally used. As the optical element is formed and the flaws become smaller, a shorter wavelength generally from the visible spectrum is used. For wavelengths other than that which the particular null lens testing apparatus was designed for, the null lens suffers chromatic aberrations of all orders and thus is not effective at these wavelengths, especially as the optical element becomes more aspheric requiring greater aberrations to be formed by lens 16. Therefore, to test optical element 20 at different stages through its fabrication, separate null lens apparatus incorporating this design usually needs to be developed.

A hybrid null lens according to a preferred embodiment of the present invention includes both refractive and diffractive optical elements to generate a dual wavelength wavefront from beam 24. Returning to FIG. 1, lens 16 having flat side 30 and rounded side 32 includes a diffraction grating (not shown) on flat side 30. Likewise, lens 18 having flat side 34 and rounded side 36 also includes a diffraction grating (not shown) on flat side 34. The diffraction gratings can be etched on flat side 30 of lens 16 and flat side 34 of lens 18, or can be a variety of other diffraction gratings known to those skilled in the art. One particular method incorporating a diffraction grating for providing wavefronts having particular wavelengths is the use of a zone plate well known to those skilled in the art.

When focused beam 24 from objective lens 14 impinges on lens 16 it is shaped into a beam 25 having two coincident wavefronts, which are tuned to system 10, at two separate wavelengths. Both of these wavelengths are formed by the combination of the diffraction grating on the flat side 30 of lens 16 and the dispersive qualities of lens 16 itself. The grating forms two wavefronts at two wavelengths of interest, and the dispersive powers of lens 16 positions the two wavefronts to be coincident with each other. The grating and the lens are selected such that the two wavefronts at the two wavelengths of interest are practically identical. These two wavefronts at the two wavelengths of interest are used to conform to the surface shape of element 20. In other words, the radius of curvature, thickness, index of refraction and position of lens 16, and the spatial frequency structure of the grating are determined by the f-number (inverse of the aperture of lens 14) of the objective lens 14, the f-number and the surface shape of the optical element 20, and the two wavelengths of interest. The two wavefronts which are formed by lens 16 are further shaped by the grating on the flat side 34 of lens 18 and the lens 18 itself, in the same manner as with lens 16, to more precisely match the surface shape of the optical element 20 under test. The null lens testing apparatus 10 is therefore tuned for each separate wavelength, and can use each wavelength separately or together. It will be understood that the diffractive and refractive optical elements can be reversed to achieve the same result, and further, the positioning of the refractive and diffractive optical elements relative to each other can be changed dramatically.

By using the two wavelengths simultaneously the principles of two-wavelength holography (well known to those skilled in the art) can be realized. Once the wavefront is reflected off of the optical element 20 and returns to the interferometer as discussed above, the interference patterns which are created by each of the wavelengths can be combined into an equivalent wavelength by the following formula.

$$\lambda_{eq} = \frac{(\lambda_1)(\lambda_2)}{|\lambda_1 - \lambda_2|} \qquad (1)$$

Therefore the equivalent wavelength $\lambda_{eq}$ can be used to desensitize the testing method by the principle of two-wavelength holography. This principle involves superimposing the fringe patterns created by each of the two wavelengths to form a moire pattern having a lesser number of fringes. Therefore, a single system 10 can be used for a wide range of manufacturing stages to test the optical element 20 as the detection of flaws becomes more difficult and crucial. In other words, the equivalent wavelength creates an interference pattern which could be formed by a light beam at a longer wavelength than that of either of the two wavelengths being used, and thus, larger defects in the early manufacturing stages can be more readily viewed. Once the optical element nears the finishing fabrication stages, either one of the shorter wavelengths can be used separately to view the smaller defects.

To illustrate the present invention by example, an achromatic null lens according to a preferred embodiment of the present invention can be tuned to wavelengths of 0.488μm and 0.5145μm, which are two argon ion laser lines. The equivalent wavelength, as calculated by equation (1), from these two wavelengths is 9.47μm, which is nearly a carbon dioxide laser line. Therefore by using an argon laser to generate beam 22 the advantages of using a carbon oxide laser can also be realized. By this, for the early grinding and polishing stages of an optical element 20 the equivalent wavelength 9.47μm can be used to desensitize the system 10 to isolate larger flaws on optical element 20 by the two-wavelength holographic technique. Then during the final polishing stages, either of the wavelengths of 0.488μm or 0.5145μm can be used to realize an increased sensitivity for visualizing smaller flaws. Table I lists possible equivalent wavelengths of an argon and a helium-neon laser. If a dye laser is used, the wavelength difference between adjacent lines is so small that equivalent wavelengths can vary from the visible spectral range to the millimeter range. By this, the dynamic range of the testing accuracy is enhanced by at least 4 orders of magnitude.

TABLE 1

| | POSSIBLE EQUIVALENT WAVELENGTH OBTAINABLE WITH AN ARGON AND A HELIUM-NEON LASER | | | | | | |
|---|---|---|---|---|---|---|---|
| | $\lambda_1$ | | | | | | |
| | $\lambda_{eq}$ | | | | | | |
| $\lambda_2$ | 0.4579 | 0.4765 | 0.4880 | 0.4965 | 0.5017 | 0.5145 | 0.6328 |
| 0.4579 | — | 11.73 | 9.95 | 5.89 | 5.24 | 4.16 | 1.66 |
| 0.4765 | 11.73 | — | 20.22 | 11.83 | 9.49 | 6.45 | 1.93 |
| 0.4880 | 9.95 | 20.22 | — | 28.5 | 17.87 | 9.47 | 2.13 |
| 0.4965 | 5.89 | 11.83 | 28.5 | — | 47.9 | 14.19 | 2.30 |
| 0.5017 | 5.24 | 9.49 | 17.87 | 47.9 | — | 20.16 | 2.42 |
| 0.5145 | 4.16 | 6.45 | 9.47 | 14.19 | 20.16 | — | 2.75 |
| 0.6328 | 1.66 | 1.93 | 2.13 | 2.30 | 2.42 | 2.75 | — |

Ref. Wyant, J.C., "Testing Aspherics Using Two-Wavelength Holography," Appl. Opt., 10. p 2113 (1971).

Figure 2:
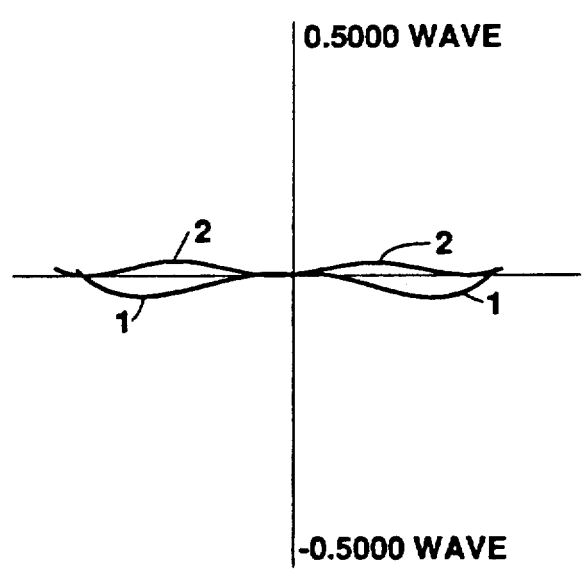
FIG. 2 is a graph showing certain relationships representing the precision of the preferred embodiment.

A specific example of an optical element under test is an F/3, 2 meter aperture parabola, depicted generally by element 20. By encoding the flat side of lenses 16 and 18 with a diffraction grating, such as a binary phase grating well known to those skilled in the art, and using the example of wavelengths of 0.488μm and 0.5145μm, the two meter aperture parabola can achieve residual wavefront errors, shown in FIG. 2, of less than 0.1 wave peak-to-valley. In other words, the system 10 can be tuned to detect flaws in optical element 20 having dimensions up to 0.1 of the wavelength used, whether it be the first or second wavelength, or the equivalent wavelength. Because the system 10 is tuned to both of the wavelengths 0.488μm and 0.5145μm, the system 10 is also tuned to the equivalent wavelength 9.47μm. In FIG. 2, line 1 represents the design residual error of the first wavelength and line 2 represents the design residual error of the second wavelength.

By combining the hybrid achromatic null lens and the two wavelength holographic technique, an apochromatic null lens is created which is capable of testing fast, generalized aspheric optics from the early fabrication steps down to the final polishing stages. Therefore, the system is applicable to many different optical testing methods for conic or generalized aspheric surfaces. One specific testing which can be realized by the present invention is the phase matching of mirror panels of a segmented mirror well known to those skilled in the art. This phase matching requires solving the $2\pi$ phase ambiguity of different segments. Such a task has been a formidable one in the prior art null testing devices. The simple optical form and larger tolerance margin of the present invention makes the hybrid null lens ideal for the application of panel phase matching of a segmented optic or final system test.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An apparatus for testing an object for flaws, said apparatus comprising:
   beam generating means for generating a beam of optical radiation;
   a first diffractive optical element and a first refractive optical element, said beam generating means directing the beam of optical radiation onto the first diffractive and refractive optical elements and then onto the object under test, said first diffractive and refractive optical elements creating two substantially coincident wavefronts at first and second wavelengths from the beam of optical radiation; and
   receiving means for receiving the wavefronts after the wavefronts have impinged the object under test.

2. The apparatus according to claim 1 wherein the first diffractive optical element is a grating etched onto the first refractive optical element, said first refractive optical element and said first diffractive optical element forming a first lens system.

3. The apparatus according to claim 1 further comprising a second diffractive optical element and a second refractive optical element, said second diffractive optical and said second refractive optical element receiving the coincident wavefronts from the first refractive optical element and the first diffractive optical element.

4. The apparatus according to claim 1 further comprising an interferometer, said interferometer including the beam generating means and the receiving means, said interfermometer further including interference means for superimposing an interference pattern of the first wavelength onto an interference pattern of the second wavelength to develop a combined interference pattern of the first and second wavelengths.

5. The apparatus according to claim 2 further comprising an objective lens, said objective lens focusing the beam of optical radiation on the first lens system.

6. The apparatus according to claim 2 wherein the first lens system forms the wavefronts to substantially conform to the shape of the object under test.

7. The apparatus according to claim 3 wherein the second diffractive optical element and the second refractive optical element form a second lens system.

8. The apparatus according to claim 7 wherein the first and second lens systems form an Offner type lens system.

9. The apparatus according to claim 1 wherein the first diffractive optical element is a zone plate.

10. The apparatus according to claim 7 wherein the second lens system provides high order aberrations to further conform the wavefronts to the shape of the object under test.

11. The apparatus of claim 1 further comprising interference means for superimposing an interference pattern formed from the first wavelength on an interference pattern formed from the second wavelength to develop a combined interference pattern of the first and second wavelengths.

12. A null lens comprising:
a first diffractive optical element and a first refractive optical element, said first diffractive and refractive optical elements creating two substantially coincident wavefronts at first and second wavelengths.

13. The null lens of claim 12 wherein the first refractive optical element is a dispersive glass element having a first side and a second side, and wherein the first diffractive optical element is formed on the first side of the first refractive optical element.

14. The null lens of claim 13 wherein the diffractive optical element is etched on the dispersive glass element.

15. The null lens of claim 12 further comprising a second diffractive optical element and a second refractive optical element, said second diffractive and refractive optical elements receiving the coincident wavefronts from the first diffractive and refractive optical elements.

16. The null lens of claim 15 wherein the second refractive optical element is a dispersive glass element having a first side and a second side, and wherein the second diffractive optical element is formed on the first side of the second refractive optical element.

17. The null lens of claim 13 wherein the first side is substantially flat and the second side is rounded.

18. A method of conducting a flaw test on an object comprising the steps of:
forming an beam of optical radiation;
impinging the beam on a first diffractive optical element and a first refractive optical element to create two substantially coincident wavefronts at first and second wavelengths;
impinging the coincident wavefronts on the object under test; and
analyzing a beam of optical radiation reflected from the object under test.

19. The method according to claim 18 further comprising the steps of impinging the coincident wavefronts on a second diffractive optical element and a second refractive optical element to image the beam on the object.

20. The method according to claim 18 wherein the step of analyzing a beam of optical radiation includes the steps of applying the reflected beam of radiation from the object under test to an interferometer and superimposing an interference pattern of the first wavelength from the reflected beam on an interference pattern of the second wavelength from the reflected beam to form a combined interference pattern.

21. The method according to claim 18 wherein the first diffractive optical element and the first refractive optical element further form the wavefronts to substantially conform to the shape of the object.

22. The method according to claim 19 wherein the second diffractive and refractive optical elements further form the wavefronts to conform to the shape of the object.

* * * * *